No. 790,369. PATENTED MAY 23, 1905.
J. VON DER KAMMER.
SPROUTING APPARATUS.
APPLICATION FILED APR. 4, 1904.
4 SHEETS—SHEET 1.
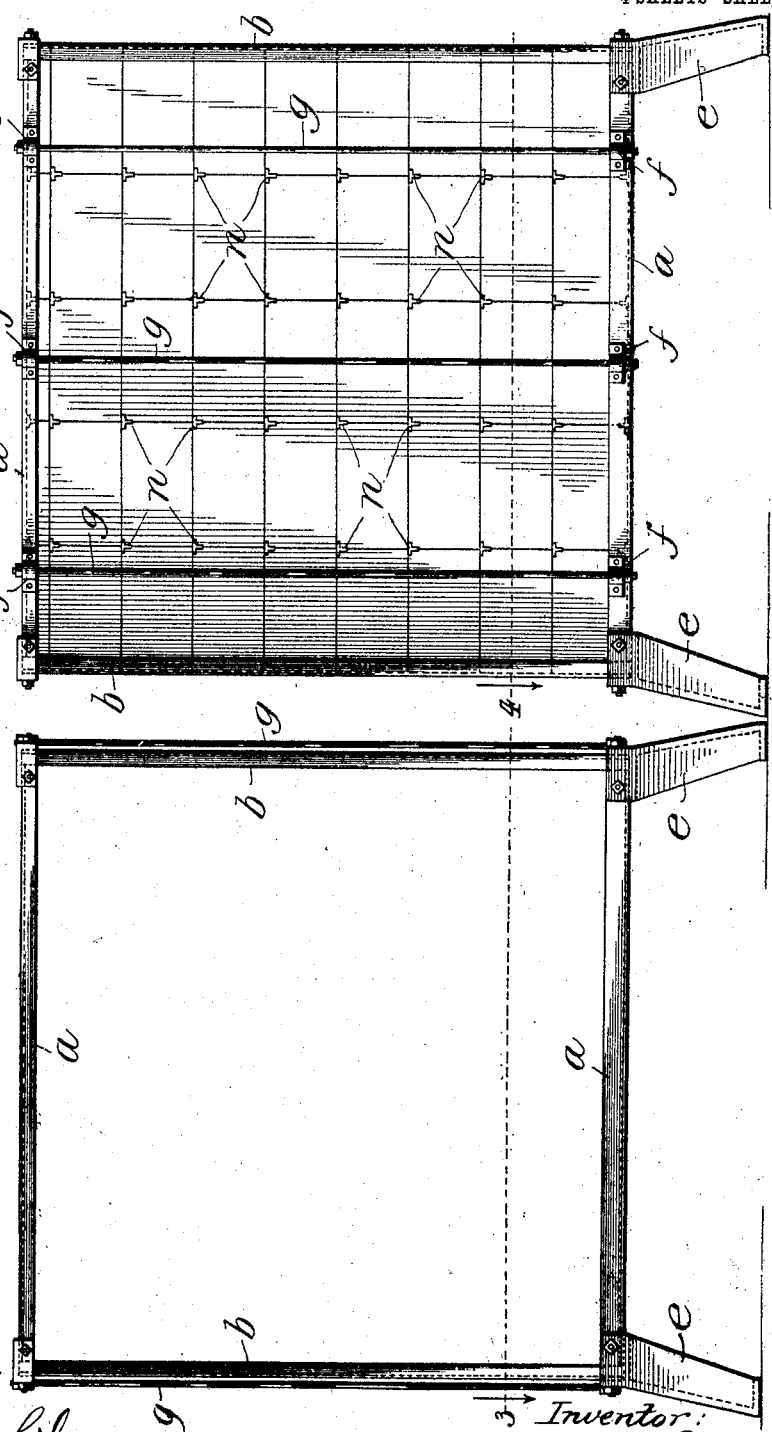
Inventor:
John von der Kammer,
Witnesses:

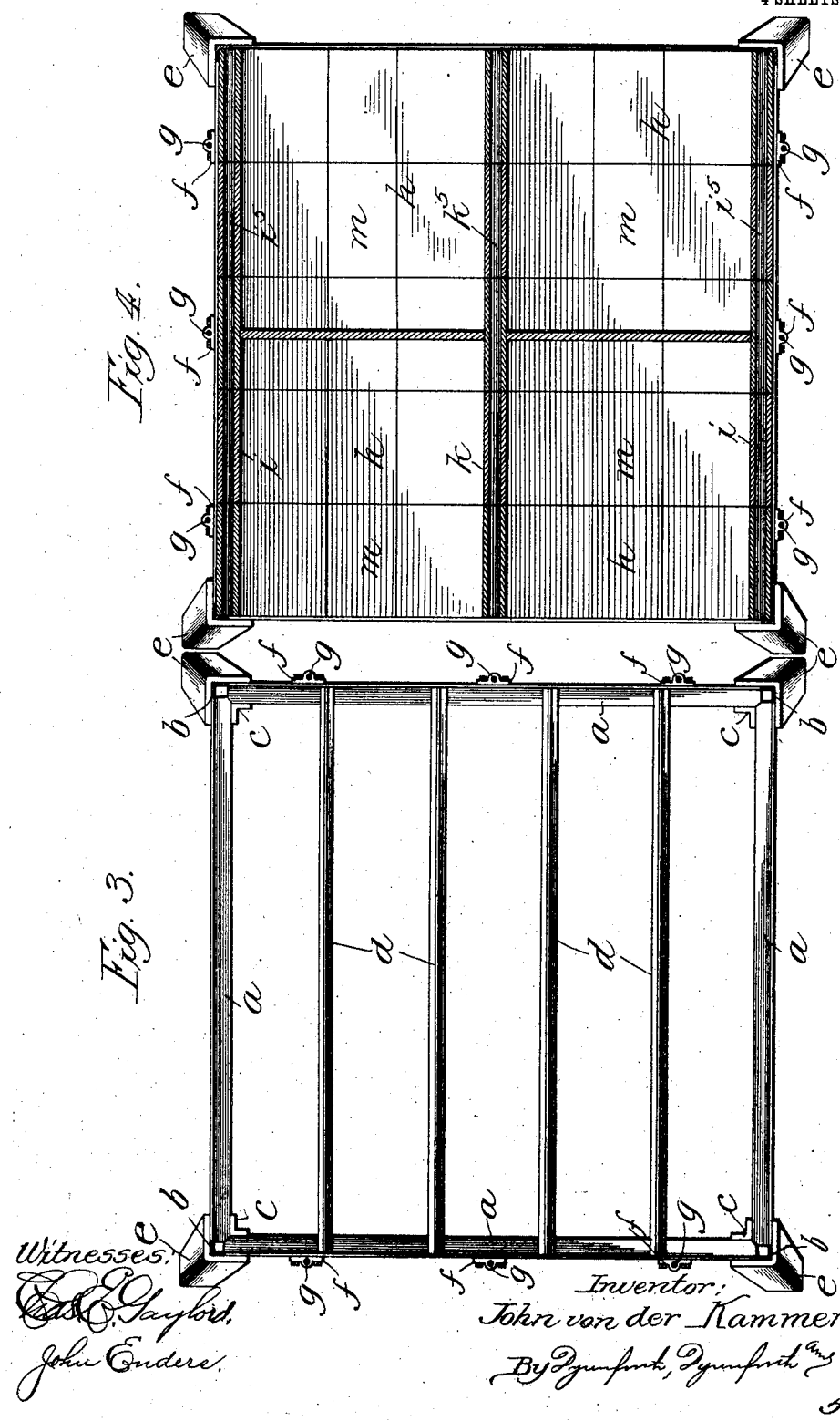

No. 790,369. PATENTED MAY 23, 1905.
J. VON DER KAMMER.
SPROUTING APPARATUS.
APPLICATION FILED APR. 4, 1904.
4 SHEETS—SHEET 3.
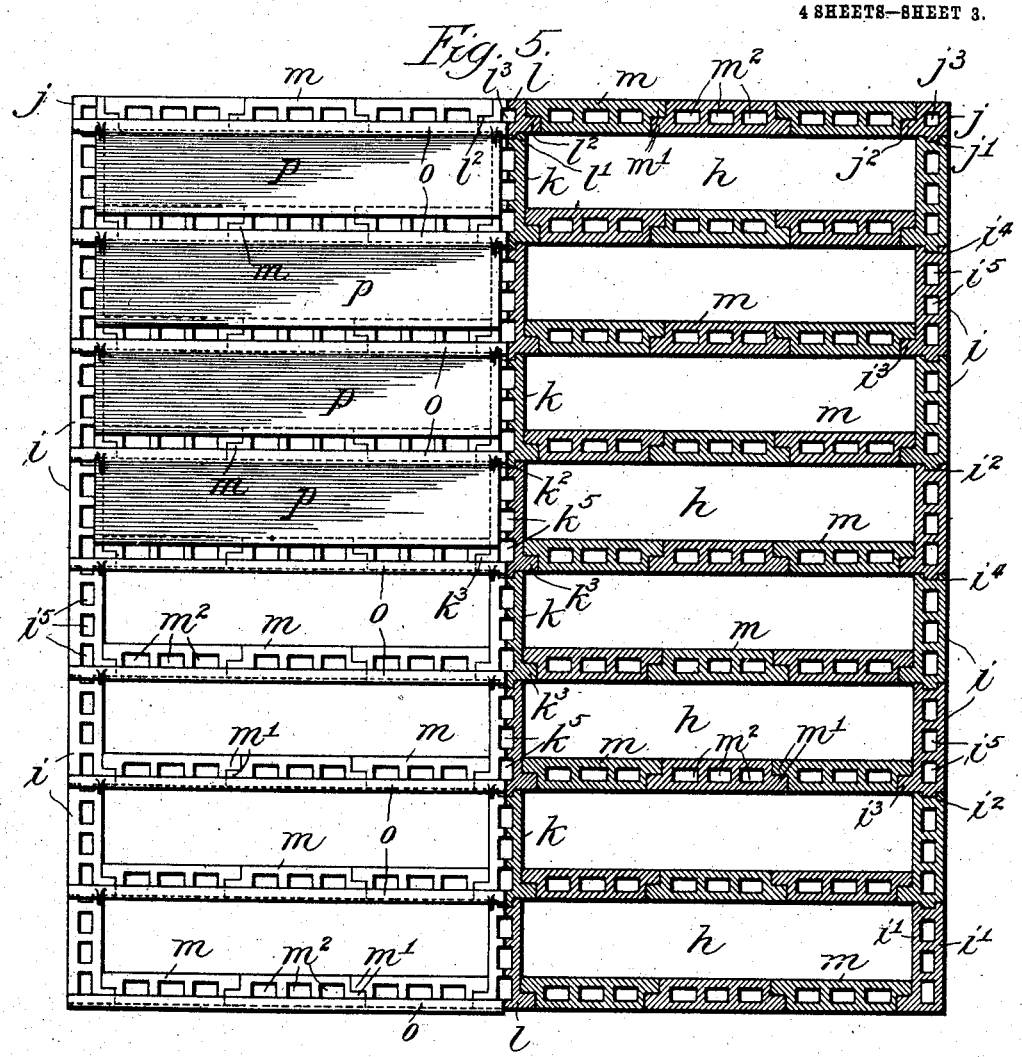
Witnesses:
Inventor:
John von der Kammer,
By Dyrenforth, Dyrenforth & Lee,
Att'ys No. 790,369. PATENTED MAY 23, 1905.
J. VON DER KAMMER.
SPROUTING APPARATUS
APPLICATION FILED APR. 4, 1904.
4 SHEETS—SHEET 4.
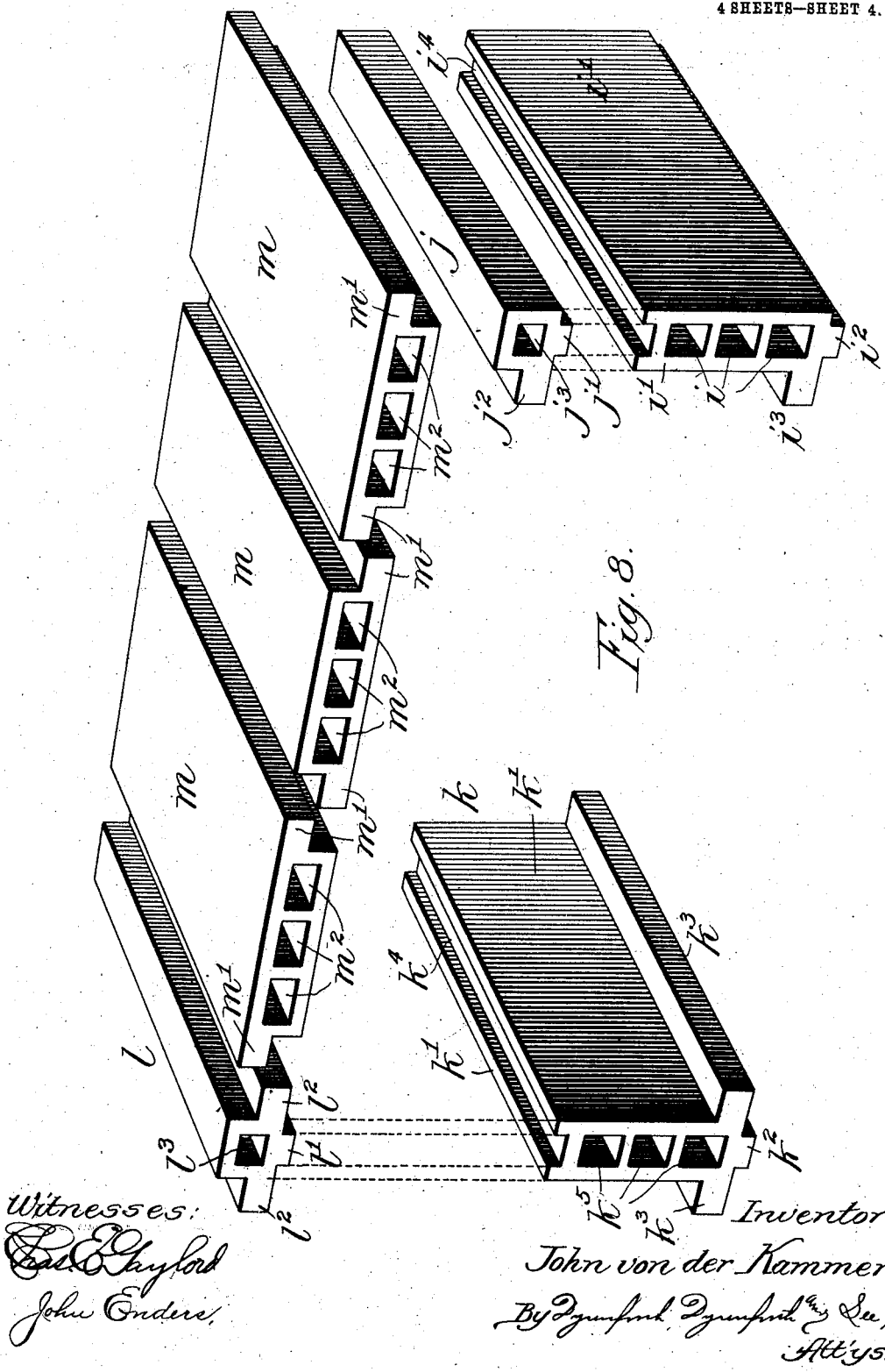

No. 790,369. Patented May 23, 1905.

UNITED STATES PATENT OFFICE.

JOHN VON DER KAMMER, OF PRAIRIEVIEW, ILLINOIS.

SPROUTING APPARATUS.

SPECIFICATION forming part of Letters Patent No. 790,369, dated May 23, 1905.

Application filed April 4, 1904. Serial No. 201,512.

*To all whom it may concern:*

Be it known that I, JOHN VON DER KAMMER, a citizen of the United States, residing at Prairieview, in the county of Lake and State of Illinois, have invented a new and useful Improvement in Sprouting Apparatus, of which the following is a specification.

My invention relates to an improvement upon the apparatus forming the subject of United States Letters Patent No. 679,124, granted to me July 23, 1901. As the result of much experimentation in the practice of the art for which I devised the subject of my aforesaid patent I have discovered that the germination of grains, tubers, and bulbs may be advantageously promoted by subjecting them in a closed porous chamber of solid non-vegetable material to the action of moisture while under the influence of atmospheric air constantly supplied to the chamber through the fine pores in its walls. This discovery enables the use of moss, formerly employed by me in the walls of the chamber, to be avoided, it having been found by experience in its use that the moss becomes compacted, whereby the porosity of the walls is impaired, preventing the free circulation necessary to permit the interchange of gases required to promote rapid growth, and that the moss will decay in time, requiring the structure to be rebuilt, thus incurring trouble and expense.

The preferred construction of my new sprouting apparatus is illustrated in the accompanying drawings, in which—

Figure 1 is a view of the framework in front (or rear) elevation; Fig. 2, a view of the completed structure in side elevation; Fig. 3, a section taken at the line 3 on Fig. 1 and viewed in the direction of the arrow; Fig. 4, a section taken at the line 4 on Fig. 2 and viewed in the direction of the arrow; Fig. 5, a view in front (or rear) elevation, half in vertical section, showing the wall construction more in detail than it is shown in Fig. 2; Fig. 6, an end view of an open-work drawer such as it is preferred to provide in each compartment of the structure; Fig. 7, a side view of the same, and Fig. 8 a perspective view showing the different forms of hollow porous tiling employed as the preferred material for the walls of the structure.

The frame, which is shown of rectangular shape, is composed of metal, the base and top being each formed of four angle-bars $a$, fitted together at the corners, from which rise similar bars $b$, connecting the top frame and the base-frame, the inner angles of the corners of the latter being reinforced with angle-irons $c$ and the structure being supported above the ground on feet $e$ at the several corners, and T-bars $d$ join the side bars $a$ of the base-frame at intervals. At intervals along the outer surfaces of the side bars of the base and top frames are fastened sockets $f$ for tie-rods $g$.

As represented the structure comprises two vertical tiers of compartments or chambers $h$, each being about one-half the width of the structure and extending entirely through it from end to end, though it is within the purview of my invention to provide any number of such tiers or only a single chamber.

In the structure illustrated I employ porous and therefore unglazed hollow tiling for the walls of the apparatus. For the sides the tiles are of the form represented at $i$ in Fig. 8, each having flat sides $i'$, a base-flange $i^2$, an inwardly-extending flange $i^3$ at the base, a longitudinal top groove $i^4$, and a plurality of longitudinal chambers $i^5$. These tiles for the bases of the sides are devoid of the flanges $i^2$, and they are laid one upon the other with the flange $i^2$ of each entering the groove $i^4$ in the one below it to the tops of the side walls, where the tiles like that shown at $j$ in Fig. 8 are employed, each being rectangular in cross-section with a channel $j^3$ extending longitudinally through it and having a base-flange $j''$ to enter the groove $i^4$ in the uppermost tile $i$ and a side flange $j^2$. The central wall dividing the apparatus into two tiers of chambers $h$ is built of hollow tiles of the form represented at $k$ in Fig. 8, each having flat sides $k'$, a base-flange $k^2$, (except in the tiles used at the base of the wall, from which this flange is omitted,) lateral flanges $k^3$ $k^3$ at the base, a longitudinal top groove $k^4$, and a plurality of longitudinal channels $k^5$. These tiles are laid one upon the other, as are the tiles $i$, with cement for binding them in each case to the top of that wall where tiles are employed like that shown at $l$ in Fig. 8, having a body rectangular in cross-section provided with a base-flange $l'$, lateral flanges $l^2 l^2$, and a longitudinal channel $l^3$. The bases and tops of the chambers $h$ are formed with hollow tiles like those represented at $m$ in Fig. 8, having flat upper and lower surfaces with lateral flanges $m'$ and a plurality of parallel longitudinal channels $m^2$. These are laid in successively reverse order crosswise of the frame, with the flanges $m'$ on the outer edges of the outermost tiles $m$ in each section of the structure resting upon the flanges $i^3$ of the tiles $i$ and the flanges of the intermediate tile $m$ overlapped by those of the similar tiles flanking it. As many sets of these overlapping tiles $m$ are laid in vertical order as there are chambers $h$ to be provided, and the number thereof employed in each horizontal line thereof from front to rear of the apparatus depends upon the length or depth of the apparatus in that direction. Where the ends of the tiles $m$ meet, T-bars $n$ are interposed between them for reinforcement, and the outer ends of these tiles are faced by the vertical flanges of angle-bars $o$, on which metal doors $p$ are hinged at their upper edges for closing the entrances to the chambers at their opposite ends. The rods $g$, fastened at their ends in the upper and lower sockets $f$, serve to tie the structure vertically.

To use the apparatus, it is kept wet throughout with water, and the grain, tubers, or bulbs to be sprouted are introduced into the chambers $h$, preferably but not necessarily in open-work receptacles, such as woven-wire drawers like the one represented at $q$ in Figs. 6 and 7. When the drawers are used, two may be introduced into each chamber, one from each end. To supply the necessary moisture, the walls are kept saturated with water by directing a stream thereof against them at required intervals, though the moisture may be supplied, at least in part, by drenching the contents of the chambers with water, the excess of which is absorbed by the porous walls and maintains them in their required moist condition for the growth-producing effect of the moisture upon the air admitted through the porous walls into the chambers and circulated therein to enhance the sprouting of their contents.

The use of the apparatus thus described shows a marvelous effect in promoting the growth of grains, tubers, and bulbs, even greater than that produced by the apparatus of my said former patent, and it is permanent and always clean and pure. While hollow tiling is preferred for the structure, because of the air circulation it induces through the wall, solid tiling may be used to advantage, and, in fact, tiling is not indispensable, since any form of solid non-vegetable material that will render the chamber-walls adequately porous may be used, particularly where cheapness of construction is an object.

What I claim as new, and desire to secure by Letters Patent, is—

1. A sprouting apparatus comprising a frame of metal and a plurality of sprouting-chambers supported therein having their inclosing walls formed of solid porous non-vegetable material and readily absorbent of moisture through their entire thickness, substantially as and for the purpose set forth.

2. A sprouting apparatus comprising a frame of metal and a plurality of sprouting-chambers having door-closed openings at their ends, said chambers having their inclosing walls formed of solid porous non-vegetable material and readily absorbent of moisture through their entire thickness, substantially as and for the purpose set forth.

3. A sprouting apparatus comprising a frame of metal with legs on its base for supporting it, and one or more tiers of sprouting-chambers having door-closed entrances, said chambers having their inclosing walls formed of solid porous non-vegetable material and readily absorbent of moisture through their entire thickness, substantially as and for the purpose set forth.

4. A sprouting apparatus comprising a frame of metal and a plurality of sprouting-chambers having door-closed entrances, said chambers having their inclosing walls formed of interfitting tiling and readily absorbent of moisture through their entire thickness, substantially as and for the purpose set forth.

5. A sprouting apparatus comprising a frame of metal and a plurality of sprouting-chambers having door-closed entrances, said chambers having their inclosing walls formed of interfitting hollow tiling and readily absorbent of moisture through their entire thickness, substantially as and for the purpose set forth.

6. A sprouting apparatus comprising a frame of metal with legs on its base for supporting it, and one or more tiers of sprouting-chambers having door-closed openings, said chambers having their inclosing walls formed of interfitting tiling and readily absorbent of moisture through their entire thickness, substantially as and for the purpose set forth.

7. A sprouting apparatus comprising a frame of metal with legs on its base for supporting it, and one or more tiers of sprouting-chambers having door-closed openings, said chambers having their inclosing walls formed of interfitting hollow tiling and readily absorbent of moisture through their entire thickness, and metal bars interposed between the adjacent ends of the tiling-sections forming the tops and bottoms of the chambers, substantially as and for the purpose set forth.

8. A sprouting apparatus comprising a frame of metal, door-closed sprouting-chambers in vertical series having side walls formed of interfitting hollow tiles $i$ and their top and bottom walls formed of interfitting hollow tiles $m$ with hollow tiles $j$ forming the upper corners of the structure, T-bars between the tiles $m$ and angle-bars facing those at the ends of the structure, substantially as and for the purpose set forth.

9. A sprouting apparatus comprising a frame of metal, tiers of sprouting-chambers open at their opposite ends, having the side walls formed of interfitting hollow tiles $i$, their top and bottom walls formed of interfitting hollow tiles $m$ with hollow tiles $j$ forming the upper corners of the structure, a partition-wall between the tiers formed of interfitting hollow tiles $k$, T-bars between the tiles, angle-bars facing those at the ends of the structure, doors hinged to said angle-bars for closing the open ends of the chambers, and vertical tie-rods binding the structure together, substantially as and for the purpose set forth.

JOHN VON DER KAMMER.

In presence of—
WALTER N. WINBERG,
ALMA U. THORIEN.